(12) United States Patent
Amano et al.

(10) Patent No.: US 6,861,767 B2
(45) Date of Patent: Mar. 1, 2005

(54) POWER SUPPLY EQUIPMENT FOR MOTOR VEHICLE WITH BATTERY AND CAPACITOR

(75) Inventors: Masahiko Amano, Hitachiota (JP); Yasuo Morooka, Hitachi (JP); Taizo Miyazaki, Hitachi (JP); Tomoyuki Hanyu, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 60 days.

(21) Appl. No.: 09/941,725

(22) Filed: Aug. 30, 2001

(65) Prior Publication Data
US 2002/0158513 A1 Oct. 31, 2002

(30) Foreign Application Priority Data
Apr. 25, 2001 (JP) .................................. 2001-127044

(51) Int. Cl.⁷ .................................................. B60L 1/00
(52) U.S. Cl. .................... 307/10.1; 180/65.2; 180/65.3; 180/65.4
(58) Field of Search .................... 123/179.28; 320/166; 290/31, 32; 60/706; 180/65.2, 65.3, 65.4

(56) References Cited

U.S. PATENT DOCUMENTS

| | | | |
|---|---|---|---|
| 5,513,718 A | * | 5/1996 | Suzuki et al. .............. 180/65.2 |
| 5,650,713 A | * | 7/1997 | Takeuchi et al. .............. 322/16 |
| 6,066,928 A | * | 5/2000 | Kinoshita et al. .......... 318/139 |
| 6,230,496 B1 | * | 5/2001 | Hofmann et al. ............. 60/706 |

FOREIGN PATENT DOCUMENTS

| | | |
|---|---|---|
| DE | 299 19 099 | 5/2000 |
| JP | 4-271209 | 9/1992 |
| JP | 06-346747 | 12/1994 |
| JP | 10-184506 | 7/1998 |
| JP | 10-191576 | 7/1998 |
| JP | 2000-156919 | 6/2000 |
| JP | 2000-283011 | 10/2000 |
| JP | 2000-295715 | 10/2000 |

OTHER PUBLICATIONS

European Search Report dated Jan. 23, 2004.

* cited by examiner

*Primary Examiner*—Shawn Riley
(74) *Attorney, Agent, or Firm*—Crowell & Moring LLP

(57) ABSTRACT

Power supply equipment for a motor vehicle, includes a motor generator, an inverter for driving the motor generator, a battery and a capacitor of an electrical double layer. The capacitor is directly connected to a DC side of the inverter and the battery is connected in parallel with the capacitor via a first switching unit. When an engine is started up, the power stored in the capacitor is used, and the switching units are turned off to separate the battery from the start-up of the engine.

6 Claims, 5 Drawing Sheets

US 6,861,767 B2

POWER SUPPLY EQUIPMENT FOR MOTOR VEHICLE WITH BATTERY AND CAPACITOR

BACKGROUND OF THE INVENTION

The present invention relates to power supply equipment for motor vehicles, including a motor generator driven by an inverter, and more particularly to power supply equipment for a motor vehicle, suitable for increasing the life of a battery, using an electrical double layer capacitor.

Recently, a system has been developed, which has a single motor generator that is used both as a conventional starter and a conventional alternator in which 42 volts are employed as a power supply voltage in order to improve a fuel efficiency in the vehicle. The motor generator is ordinarily driven by an inverter, and has an idle stopping function that stops the engine when the vehicle stops and that re-starts the engine when the vehicle is driven, a regenerative braking function that charges the battery with decelerating energy by a generator operation performed when the vehicle is decelerated, and an assisting function that applies a drive torque to a driving shaft in acceleration.

Application of a lead acid battery chargeable/dischargeable with a large electrical current at low cost has been studied as a battery for power supply. Since the output of this battery can lower at low temperatures/low charge rates, the engine is difficult to start up. Thus, it is necessary for the battery to have a sufficient capacity. Charging/discharging the battery with a large current affects the life of the battery adversely, and it is necessary to restrict the charging current especially.

In view of these problems, power supply equipment for motor vehicles has been studied that is intended to increase the service life of the battery by using a capacitor of an electrical double layer having a long life compared to the battery and being chargeable/dischargeable with a large current.

A first example is JP-A-10-184506 and 10-191576, which disclose power supply equipment for a motor vehicle, comprising a capacitor of an electrical double layer and a battery connected through a diode, a relay switch and a resistor in order to start up the engine with power stored in the capacitor.

A second example is JP-A-4-271209 that discloses power supply equipment for a motor vehicle, in which a capacitor of an electrical double layer and a battery are connected in parallel and also connected to corresponding switches in series in order to adjust quantities of energy stored in the capacitor and the battery, respectively, by controlling the operations of the switches.

A third example is JP-A-2000-156919 that discloses power supply equipment for a motor vehicle, in which an inverter is connected at its output to a capacitor of an electrical double layer, which is then connected to a battery through a DC/DC converter.

In the first example, however, since it is only possible to either charge the capacitor or the battery during the charging operation, the capacitor cannot increase the battery life by absorbing large transitional current.

In the second example, the capacitor cannot absorb a ripple current due to the switching of the inverter when the switch of the capacitor is off, and a capacity of an filter capacitor of the inverter cannot be reduced. Thus, it is impossible to achieve sufficient cost reduction.

In the third example, an increase in the cost cannot be avoided due to the employment of the DC/DC converter.

SUMMARY OF THE INVENTION

It is therefore an object of the present invention to provide long-life, low-cost power supply equipment for motor vehicles.

(1) In order to achieve the above object, the present invention provides power supply equipment for a motor vehicle, comprising a motor generator, an inverter for driving the motor generator, a battery and a capacitor of an electrical double layer, wherein the capacitor is directly connected to a DC side of the inverter and the battery is connected in parallel with the capacitor via first switching means. Such composition gives the equipment an increased life and reduces its cost.

(2) Preferably, the power supply equipment further comprises control means for turning off the first switching means in the start-up of an engine to separate the battery from the capacitor and for turning on the first switching means after the start-up of the engine to connect the battery to the capacitor.

(3) Preferably, the power supply equipment defined in (2) further comprises: a series circuit of a resistor and second switching means being connected in parallel with the first switching means.

(4) Preferably, in the power supply equipment defined in (3) the control means determines which of the first and second switching means should be turned on, depending on a difference in voltage between the capacitor and the battery when the battery and the capacitor are connected by the first or second switching means.

(5) Preferably, the power supply equipment defined in (1) further comprises: a second capacitor connected in parallel with the first-mentioned capacitor between the inverter and the capacitor for eliminating high frequency ripples.

(6) Preferably, in the power supply equipment defined in (1) the first switching means comprises a diode conductible at all times so as to allow an electrical current to flow from the inverter to the battery.

(7) Preferably, in the power supply equipment defined in (1) the first switching means comprises a diode conductible at all times so as to allow an electrical current to flow from the battery to the inverter.

(8) In order to achieve the above object, power supply equipment for a motor vehicle, comprising a motor generator, an inverter for driving the motor generator, a battery and a capacitor of an electrical double layer, wherein the battery has a plurality of different (higher and lower) voltage terminals; the capacitor being directly connected to a DC side of the inverter; the capacitor being connected on its higher voltage side to a higher voltage terminal of the battery via first switching means; and the capacitor being connected on its higher voltage side to a lower voltage terminal of the battery via second switching means.

Such composition gives the equipment an increased life and reduces its cost.

DETAILED DESCRIPTION OF THE EMBODIMENTS

Figure 1:
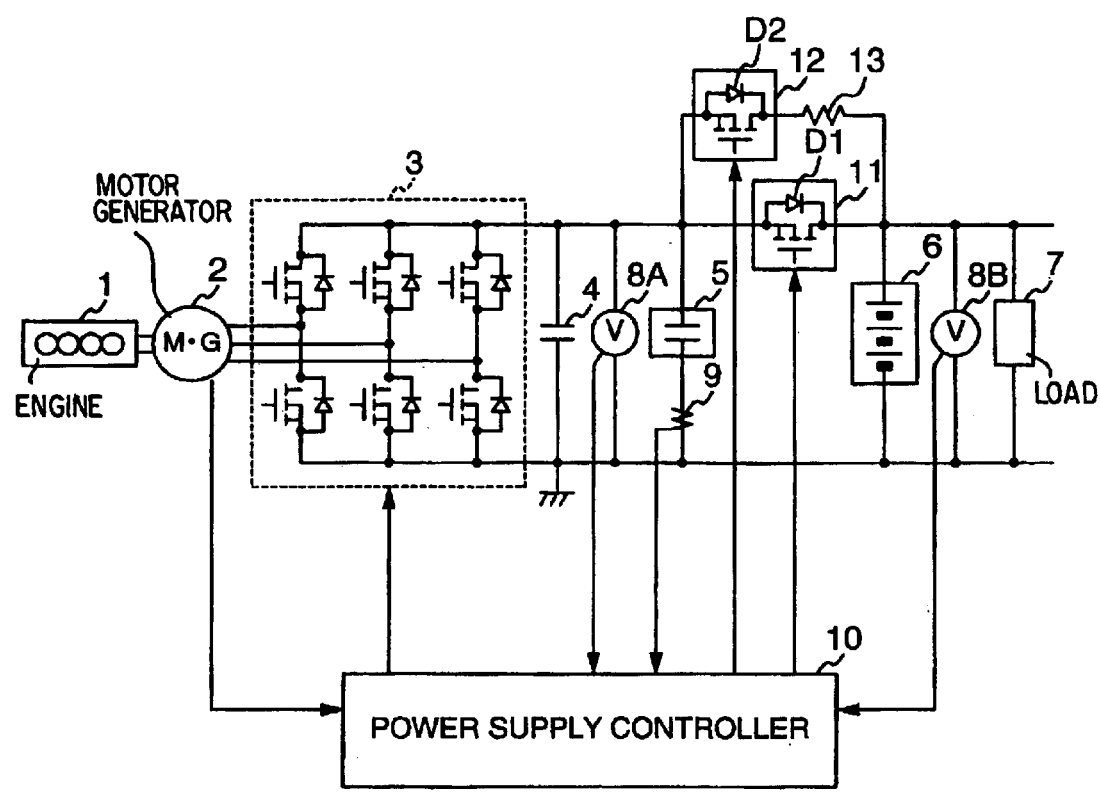
FIG. 1 is a block diagram of power supply equipment for a motor vehicle according to a first embodiment of the present invention.
Figure 2:
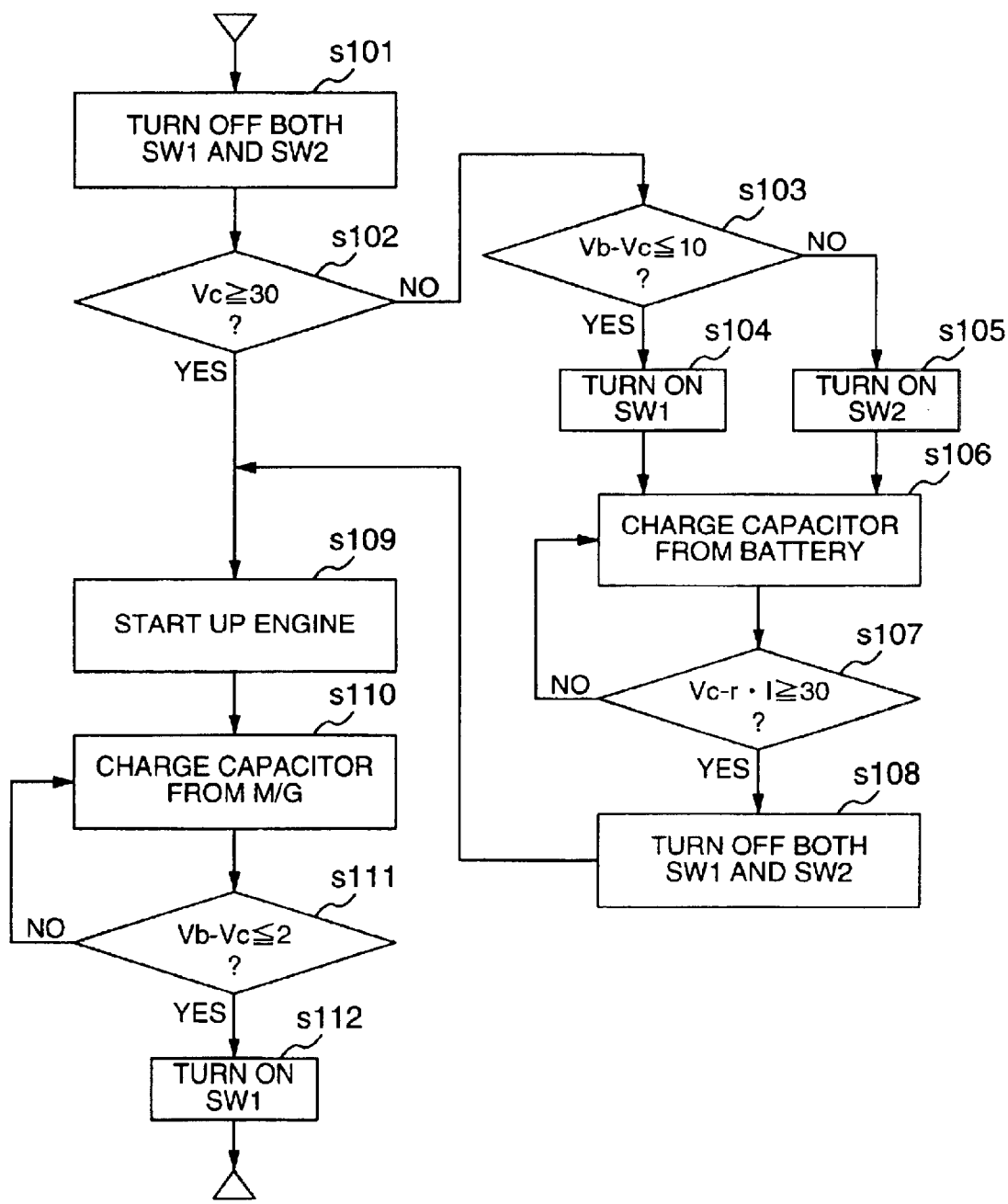
FIG. 2 is a flowchart of a control process performed by a power supply controller of the power supply equipment for the motor vehicle as the first embodiment.

Referring to FIGS. 1 and 2, the composition of the power supply equipment for a motor vehicle according to the first embodiment of the present invention will be described next.

FIG. 1 is a block diagram of the power supply equipment for a motor vehicle according to the first embodiment of the present invention. FIG. 2 is a flowchart of the control process performed by the power supply equipment for a motor vehicle according to the first embodiment. FIG. 1 shows a 42 V-power supply system for a motor vehicle to which the embodiment of the present invention is applied.

As shown in FIG. 1, a rotational shaft of the engine 1 is connected to a motor generator 2. The motor generator 2 operates as a motor to start up/assist in accelerating the engine 1. The motor generator 2 is also driven by the engine 1 to operate as a generator to generate electric power and to perform a regenerative braking operation. The driving force/power generation of the motor generator 2 is controlled by an inverter 3.

The inverter 3 is connected on its DC side to an electrolytic capacitor 4 for ripple elimination. A capacitor 5 is connected in parallel with the electrolytic capacitor 4. The capacitor 5 has a large capacity and is generally called a capacity of an electrical double layer or a super or ultra capacitor. The equipment also comprises a voltage sensor 8A that senses a voltage across the capacitor 5 and a current sensor 9 that senses a current flowing through the capacitor 5. The voltage and current sensed by the voltage sensor 8A and the current sensor 9 are delivered to a power supply controller 10.

The capacitor 5 is connected in parallel with a series circuit of a switching unit 11 and a battery 6. The battery 6 comprises a lead acid battery of a rated voltage of 36 V. In addition to the lead acid battery, for example, a high performance battery such as a nickel-hydrogen battery or a lithium ion battery is usable. A voltage sensor 8B that senses the voltage of the battery 6 is provided. The sensed voltage is delivered to the power supply controller 10.

In the illustrated embodiment, the switching unit 11 comprises a parallel circuit of a MOSFET and a diode D1 embed therein. In the embodiment, the diode D1 is disposed in such a direction that electrical charging is allowed normally from the inverter 3 to the battery 6. Thus, the switching unit 11 turns on/off only the discharge current flowing from the battery 6 to the inverter 3.

The switching unit 11 is connected in parallel with a series circuit of a resistor 13 and another switching unit 12. In the illustrated embodiment, the switching unit 12 comprises a parallel circuit of a MOSFET and a diode D2. When a difference in voltage between the capacitor 5 and the battery 6 is large and a large current may flow through the battery 6 if the capacitor 5 and the battery 6 are directly connected by the switching unit 11, the switching unit 12 is rendered conductive to thereby cause an electrical current to flow through the resistor 13. This causes the value of the electric current flowing through the battery 6 to decrease and to restrict a flow of an excessive current through the battery.

Generally, a plurality of 42-V loads 7 is connected to the battery 6. A DC/DC converter (not shown) is connected to the battery 6 to supply the 14-V system with power.

The power supply controller 10 receives information on the voltage/current of the capacitor 5, the voltage of the battery 6, and the current/rotational speed of the motor generator 2 and gives control commands to the inverter 3 and the switching units 11 and 12 at a vehicle controller's request to start up and assist in accelerating the engine and to perform a regenerative braking operation.

As described above, the characteristic composition of the present embodiment is that the capacitor 5 is connected at all times on the DC side of the inverter 3 and that the battery 6 is connected through the switching units 11 and 12 to the capacitor 5. Thus, the battery 6 is connected to and disconnected from the DC side of the inverter 3 by turning on and off the switching units 11 and 12. Such circuit composition is expressed as "The capacitor of an electrical double layer is directly connected to the DC side of the inverter and the battery is connected in parallel with the capacitor of an electrical double layer via the first switching unit" in the present embodiment." The "direct" connection of the capacitor of an electrical double layer to the DC side of the inverter means that no switching unit is connected in a line on the side of the capacitor 5 in terms of the parallel circuit of the capacitor 5 and the battery 6. Thus, note that a circuit composition in which a switching unit such as a contactor provided on a line between the DC side of the inverter 3 and the junction point of the switching unit 11 and the capacitor 5 is turned off to disconnect both the capacitor 5 and the battery 6 from the DC side of the inverter 3 should fall within the scope of the composition expressed by the wording "The electrical double layer capacitor is directly connected to the DC side of the inverter and the battery is connected in parallel with the electrical double layer capacitor via the first switching unit" in the present embodiment.

Now, referring to FIG. 2, control of the power supply controller 10 for use in the power supply equipment for the motor vehicle according to the present embodiment will be described next. FIG. 2 illustrates a flow of control from the start-up of the engine to the normal power generation.

The engine is basically started up only with power stored in the capacitor 5. Thus, in step S101 the power supply controller 10 turns off the switching unit 11 and 12. In the example of FIG. 2, the switching units 11 and 12 are indicated as SW 1 and SW 2, respectively. By turning off the switching units 11 and 12, no electrical current flows from the battery 6 to the inverter 3. Thus, the engine can be started up only with electric power stored in the capacitor 5.

Then, in step S102 the power supply controller 10 senses a voltage Vc across the capacitor 4 with the voltage sensor 8A and determines whether the voltage Vc is sufficient to start up the engine. It is now assumed that a threshold value is set at 30 V, for example. If the voltage Vc is not lower than the threshold value, the control passes directly to step S109 whereas if the voltage Vc is lower than the threshold value, the control passes to step S103. If the voltage Vc is not lower than the threshold value, in step S109 the engine is started up. If the voltage across the capacitor 5 is lower than the threshold value due to discharge of the capacitor 5, for example, when the vehicle is left alone for a long time, the battery 6 charges the capacitor 5 in steps S103 and subsequent steps.

When the voltage Vc across the capacitor 4 is lower than the threshold value, in step S103 the power supply controller 10 compares the capacitor voltage Vc with the battery voltage Vb sensed by the voltage sensor 8B. In order to determine whether a differential (Vb−Vc) between the battery voltage Vb and the capacitor voltage Vc is small or not, a voltage of 10 V, for example, is set as a second threshold value. If the differential is small, for example, not more than 10 V, the power supply controller 10 turns on the switching unit 11 in step S104 and directly charges the capacitor 5 from the battery 6 in step S106.

If the voltage difference is large, for example, more than 10 V, the switching unit 12 is turned on in step S105 so that the battery 6 is connected to the capacitor 5 via the resistor 13 and that the battery 6 charges the capacitor 5 in S106, in order to avoid a flow of a large current occurring through the switching unit 11 when the battery 6 is connected directly to the capacitor 5. If the resistor has, for example 2 Ω, the discharging current can be restricted to 10 A even when the voltage difference is 20 V.

Then, in step S107 the power supply controller 10 determines a charging state of the capacitor 5. The voltage across the capacitor 5 includes a voltage rise (r·I) occurring due to its internal resistance r when the capacitor 5 is charged. Thus, it is necessary to determine the voltage across the capacitor 5 by subtracting the voltage rise from the charging voltage where I is a value of an electrical current flowing through the capacitor 5 and sensed by the current sensor 9. In step S107 it is determined whether the capacitor 5 has stored sufficient energy due to charging depending on whether (Vc−r·I) has increased, for example, to not lower than 30 V. The capacitor 5 continues to be charged in step S106 until the capacitor is sufficiently charged, at which time the control passes to step S108 where the power supply controller 10 turns off both the switching units 11 and 12.

If the determination in step S102 is yes or the processing in step S108 is terminated, in step S109 the power supply controller 10 gives a drive command to the inverter 3 to drive the motor generator 2 and start up the engine 1.

After the engine 1 is started up, in step S110 the motor generator 2 operates as a generator and the power supply controller 10 controls the inverter 3 to thereby charge the capacitor 5. Since starting up the engine 1 consumes the energy stored in the capacitor 5, the voltage across the capacitor 5 lowers temporarily. However, the operational mode of the motor generator 2 switches to a generator mode, and at the capacitor voltage rises.

Then, in step S111 the power supply controller 10 checks the voltage across the capacitor 5. More specifically, the power supply controller 10 monitors a difference (Vb−Vc) between the voltage Vb of the battery 6 and the voltage Vc across the capacitor 5. The power supply controller 10 continues to charge the capacitor 5 in step S110 until the voltage difference becomes not more than 2 V, for example, at which time the power supply controller 10 turns off the switching unit 11 to connect the capacitor 5 to the battery 6 to thereby charge the battery 6.

In the generator mode, the capacitor 5 and the battery 6 are operated in parallel connection. Even when the switching unit 11 is not turned on, supply of power to the battery 6 is possible due to operation of a built-in diode D1 formed to be connected in parallel with an switching element of the switching unit 11. By turning on the switching unit 11, the on-resistance and hence an on-loss produced at all times are reduced.

While in the embodiment the series circuit of the resistor 13 and the switching unit 12 is used, this series circuit may be omitted when the internal resistance values of the capacitor 5 and the battery 6 are large or a transitional large current is allowed to flow through those elements.

While in the embodiment the rated voltage of the power supply is assumed as 42 V, the present invention is applicable when the rated voltage of the power supply is another voltage such as 14 or 28 V.

As described above, in the present embodiment when the engine 1 is started up, the power stored in the capacitor 5 is used and the battery 6 is separated from the capacitor 5 by turning off the switching units 11 and 12. The capacitor 5 generally has a small internal resistance compared to the battery and a voltage drop across the capacitor 5 is small even when a large current discharges through the capacitor 5. The capacitor 5 has a good temperature characteristic and a small reduction in its output compared to the battery even at low temperatures such as −30° C. Thus, as indicated by the present embodiment, the use of the capacitor ensures the start-up of the engine.

When the charge rate of the battery lowers in the prior art, the output of the battery lowers, so that the engine may not be started up satisfactorily. However, in the present embodiment the engine can be started up surely as long as the power sufficient to charge the capacitor remains in the battery. Thus, the capacity of the battery can be reduced. Since a large current does not flow into the battery at the start-up of the engine, a deterioration in the battery is prevented.

In the generator mode, the capacitor 5 and the battery 6 are operated in parallel connection, so that a deterioration in the battery 6 is prevented. More particularly, since the capacitor 5 has small internal resistance compared to the battery 6, the capacitor 5 shares a larger current compared to battery 6 when the capacitor 5 and the battery 6 are operated in the parallel connection. Thus, even when a large charging current flows through the parallel circuit of the capacitor 5 and the battery 6 in the regenerative breaking operation, the current flowing through the battery 6 is reduced to thereby suppress a deterioration in the battery 6. Since a large regenerative current is allowed to flow through the parallel circuit of the capacitor 5 and battery 6 compared to the use of the battery alone, more regenerative power can be absorbed and the absorbed energy can be used to assist in the acceleration of the vehicle and to drive an auxiliary machine to thereby improve the fuel economy of the motor vehicle.

Since current ripples produced due to the switching operation of the inverter 3 are absorbed by the capacitor 5, the filter capacitor 4 can be omitted or reduced in capacity. When the distance between the inverter 3 and the capacitor 5 is large, an inductance involved in the lines extended between the inverter 3 and the capacitor 5 is influenced or increased. Thus, in this case the filter capacitor 4 should be provided on the inverter side. The capacity of the filter capacitor 4 may be small in consideration of the case where no capacitor 5 is provided.

According to the composition of the present embodiment, even when the battery 6 goes flat, the engine can be jump-started up from a 14-V power supply installed in another vehicle. Since the battery 6 is separated from the inverter 3 by the switching units 11 and 12, a 14-V power supply installed in another vehicle can be connected to the inverter 3 to charge the capacitor 5. When the voltage across the capacitor 5 rises to about 14 V, the inverter 3 is operated and hence the motor generator 2 is driven to start up the engine 1. In this case, it is necessary to design beforehand the motor generator 2 so that the motor generator 2 can start up the engine even at 14 V.

As described above, according to the present embodiment, low-cost power supply equipment for a motor vehicle is obtained that prevents a deterioration in the battery to thereby give the battery a long service life; that reduces the capacity of the electrolytic capacitor; and that eliminates the DC/DC converter.

Next, with reference to FIG. 3, power supply equipment for a motor vehicle according to a second embodiment of the prevent invention will be described.

Figure 3:
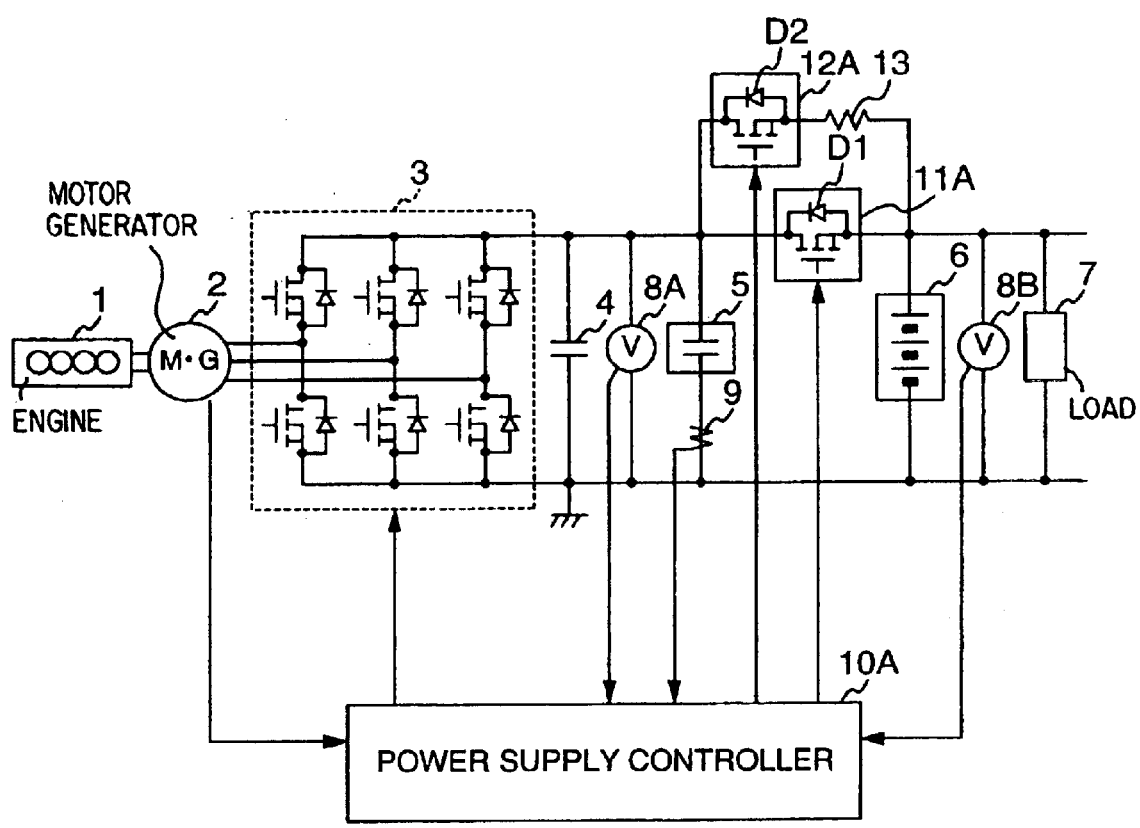
FIG. 3 is a block diagram of power supply equipment for a motor vehicle according to a second embodiment of the present invention.

FIG. 3 is a block diagram of the power supply equipment for a motor vehicle according to the second embodiment. The same reference numeral in FIGS. 3 and 1 denotes the same component of the equipment.

In the present embodiment, diodes D1 and D2 in switching units 11A and 12A are reverse in direction to those in the switching units 11 and 12 of FIG. 1, so that an electrical current flowing from the battery 6 to the inverter 3, or a discharge current, flows at all times. In this case, when the motor generator 2 acts as a driver to start up/assist in accelerating the engine, the capacitor 5 and the battery 6 are used together. While the discharge current is supplied from both the capacitor 5 and the battery 6, the current flowing through the capacitor 5 is large compared to that flowing through the battery 6 because the internal resistance of the capacitor 5 is smaller than that of the battery to thereby restrict a deterioration in the battery 6. In addition, the start up of the engine at low temperatures is improved.

In the generator mode, the power supply controller 10A normally turns on the switching unit 11A to cause the capacitor 5 and the battery 6 to operate together. In the regenerative braking operation where a larger charging current flows in the equipment, the switching unit 11A is turned off so that only the capacitor 5 absorbs the energy. The power supply controller 10A causes the switching unit 11A to cooperate with the inverter 3 so that when the charging current exceeds a threshold value, the switching unit 11A is turned off.

In order to enable the battery to be charged with a large current, its capacity should increase and its electrodes should be especially devised. However, according to the present embodiment, the necessity for charging the battery with a large current is eliminated so that the cost is reduced. In addition, a deterioration in the equipment is prevented to thereby increase its service life.

Even when the voltage across the capacitor 5 increases greatly due to a large current flowing therethrough, a mode can be selected in which the switching unit 12A connected to the battery 6 is turned on to thereby prevent a large excessive current from flowing through the battery and hence to use the battery and the capacitor together.

As described above, according to the present embodiment, low-cost power supply equipment for a motor vehicle is obtained that prevents a deterioration in the battery to thereby increase its service life; that reduces the capacity of the electrolytic capacitor; and that eliminates the necessity for the DC/DC converter.

Next, referring to FIG. 4, a composition of power supply equipment for a motor vehicle according to a third embodiment of the present invention will be described.

Figure 4:
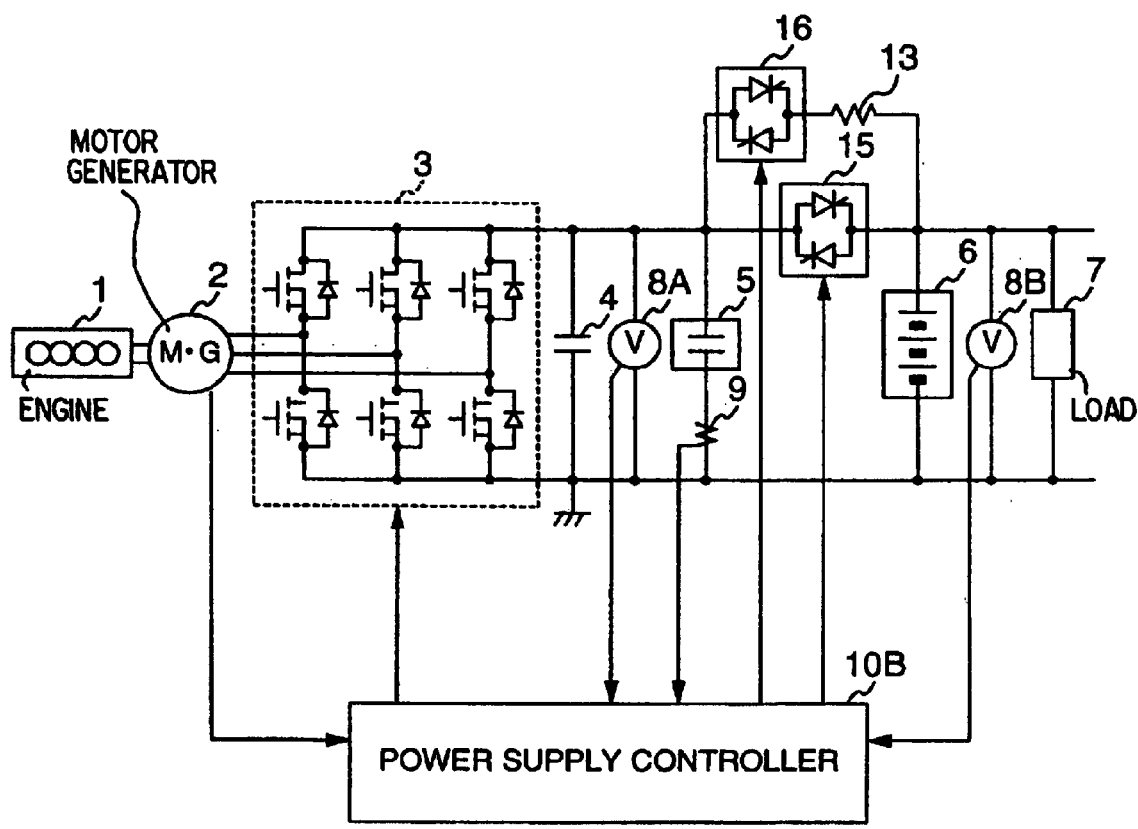
FIG. 4 is a block diagram of power supply equipment for a motor vehicle according to a third embodiment of the present invention.

FIG. 4 is a block diagram of the power supply equipment for a motor vehicle according to the third embodiment. The same reference numeral denotes the same or similar component in FIGS. 4 and 1.

In the present embodiment the switching units 15 and 16 are used to turn on and off bi-directional currents whereas the switching units 11 and 12 of FIG. 1 and the switching units 11A and 12A of FIG. 3 control only the unidirectional currents. More specifically, the switching units 15 and 16 each use a pair of reversely parallel connected thyristors to switch on/off a current flowing in both directions therethrough. In place of the pair of reversely parallel-connected thyristors, a pair of reversely series-connected MOSFETs may be used to fulfill a similar function.

The present embodiment produces advantageous effects equal to combined advantageous effects produced by both the embodiments of FIGS. 1 and 3. In each of the engine start-up and the regenerative breaking operation, the power supply controller 10B can turn off the switching units 15 and 16 so that only the capacitor 5 charges/discharges the battery 6. Thus, the charging and discharging electric currents flowing through the battery 6 can be restricted to small currents to thereby reduce the cost and increase its service life.

As described above, according to the present embodiment, the power supply equipment for a motor vehicle is obtained which prevents a deterioration in the battery to thereby increase its service life, which reduces the capacity of the electrolytic capacitor, and which eliminates the DC/DC converter to thereby reduce the cost.

Figure 5:
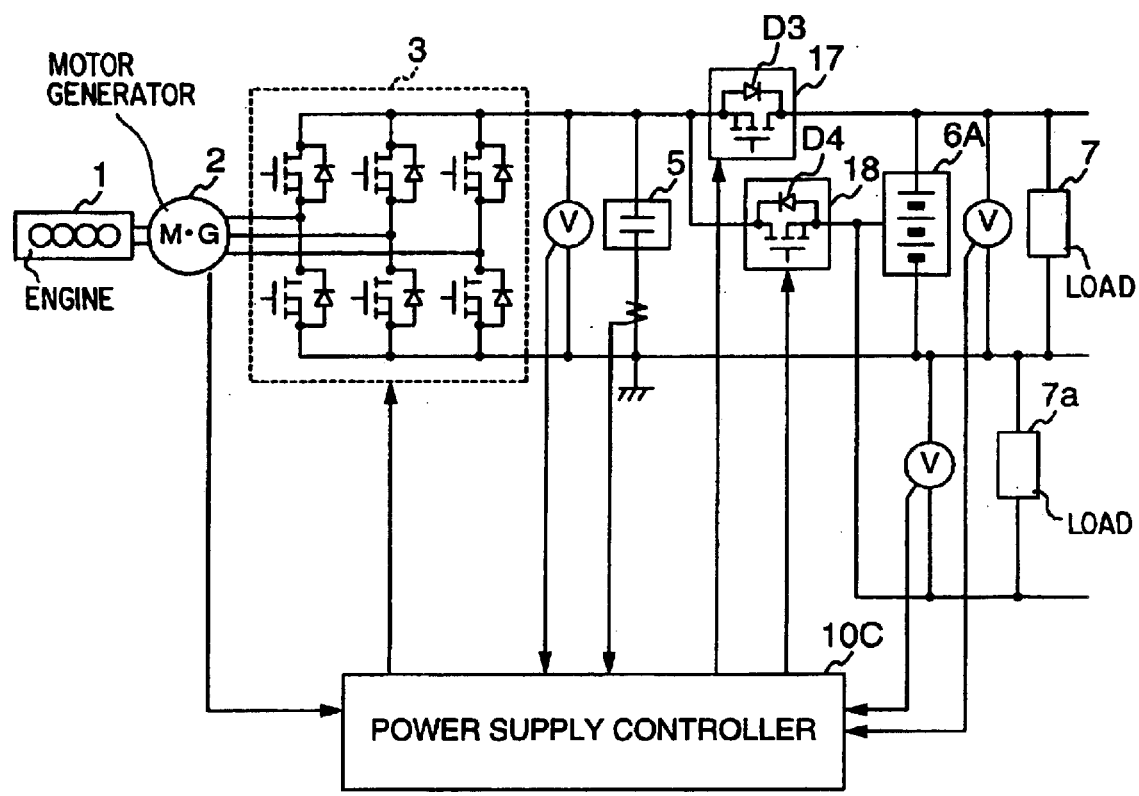
FIG. 5 is a block diagram of power supply equipment for a motor vehicle according to a fourth embodiment of the present invention.

A composition of power supply equipment for a motor vehicle according to a fourth embodiment of the present invention will be described next with respect to FIG. 5, which is a block diagram of the power supply equipment. The same reference numeral denotes the same or similar component in FIGS. 5 and 1.

In the present embodiment the power supply equipment for a motor vehicle uses a battery 6A with a plurality of (3) voltage terminals; that is, 42- and 14-V terminals and a grounded terminal.

The 42- and 14-V terminals of the battery 6A are connected via switching units 17 and 18, respectively, to an inverter 3. When the switching units 17 and 18 each comprise a MOSFET, built-in diodes D3 and D4 are formed in reverse directions to the 42- and 4-V terminals of the battery 6A, as shown, to thereby avoid short-circuiting the 42- and 14-V terminals. In this embodiment, a plurality of 14-V loads 7a is connected across the 14-V terminal of the battery 6A and ground.

The power supply controller 10C controls the turning on/off of the switching units 17 and 18 to switch the inverter 3 to either a 42- or 14-V operation. In the 42-V operation the switching units 17 and 18 are turned on and off, respectively, whereas in the 14-V operation the switching units 17 and 18 are reversely turned off and on, respectively.

When a large current flows through the circuit concerned, for example, as in the engine startup, regenerative braking operation or acceleration assistance or the like, the 42-V operation is basically performed. The connection of the components on the 42-V terminal side is similar to that of the first embodiment of FIG. 1, and hence the operation of the power supply equipment ranging from the start-up of the engine to the power generation should be performed in a process similar to that shown in FIG. 2. While in the present embodiment an element such as the resistor 13 of FIG. 1 is not shown, such element can be connected in position as shown in FIG. 1, if necessary.

The power supply equipment is operated ordinarily at 42 V even in the generator mode whereas the power supply controller 10C turns off and on the switching units 17 and 18, respectively, so that the battery 6A is charged only on its 14-V terminal side to thereby eliminate an unbalance in charge rate between the 42 and 14-V terminal sides thereof.

According to the present embodiment, use of the 3-terminal battery brings about a low-cost dual (42, 14-) volt power supply system. Additional use of the capacitor serves to reduce the capacity of the battery and to increase its service life.

What is claimed is:

1. Power supply equipment for a motor vehicle, comprising a motor generator, an inverter for driving said motor generator, a battery and a capacitor of an electrical double layer,
    wherein said capacitor is directly connected to a DC side of said inverter and said battery is connected in parallel with said capacitor via first switching means,
    further comprising control means for turning off said first switching means in the start-up of an engine to separate said battery from sadi capacitor and for turning on said first switching means after the start-up of the engine to connect said battery to said capacitor, and
    further comprising:
    a series circuit of a resistor and second switching means being connected in parallel with said first switching means.

2. The power supply equipment for a motor vehicle according to claim 1, wherein:
    said control means determines which of said first and second switching means should be turned on, depending on a difference in voltage between said capacitor and said battery when said battery and said capacitor are connected by said first or second switching means.

3. Power supply equipment for a motor vehicle, comprising:
    a motor generator;
    an inverter for driving said motor generator;
    a battery;
    a capacitor of an electrical double layer,
    wherein said capacitor is directly connected to a DC side of said inverter and said battery is connected in parallel with said capacitor via first switching means for controlling an electrical connection between the battery and the capacitor; and
    a second capacitor connected in parallel with said first-mentioned capacitor between said inverter and said capacitor for eliminating high frequency ripples.

4. Power supply equipment for a motor vehicle, comprising a motor generator, an inverter for driving said motor generator, a battery and a capacitor of an electrical double layer,
    wherein said capacitor is directly connected to a DC side of said inverter and said battery is connected in parallel with said capacitor via first switching means, and
    wherein:
    said first switching means comprises a diode conductible at all times so as to allow an electrical current to flow from said inverter to said battery.

5. Power supply equipment for a motor vehicle, comprising a motor generator, an inverter for driving said motor generator, a battery and a capacitor of an electrical double layer,
    wherein said capacitor is directly connected to a DC side of said inverter and said battery is connected in parallel with said capacitor via first switching means, and
    wherein:
    said first switching means comprises a diode conductible at all times so as to allow an electrical current to flow from said battery to said inverter.

6. Power supply equipment for a motor vehicle, comprising a motor generator, an inverter for driving said motor generator, a battery and a capacitor of an electrical double layer,
    wherein said battery has a plurality of different voltage terminals, including a positive higher voltage terminal and a positive lower voltage terminal;
    said capacitor being directly connected to a DC side of said inverter;
    said capacitor being connected on its higher voltage side to the higher voltage terminal of said battery via first switching means; and
    said capacitor being connected on its higher voltage side to the lower voltage terminal of said battery via second switching means.

* * * * *